United States Patent [19]

Eckle et al.

[11] 4,306,473

[45] Dec. 22, 1981

[54] TOOL INSERT FOR BORING OPERATIONS, PARTICULARLY FOR A BORING BAR

[75] Inventors: Otto Eckle, Loechgau; Helmut Veigel, Schwieberdingen, both of Fed. Rep. of Germany

[73] Assignee: Komet Stahlhalter- und Werkzeugfabrik Robert Breuning GmbH, Besigheim, Fed. Rep. of Germany

[21] Appl. No.: 169,323

[22] Filed: Jul. 16, 1980

[30] Foreign Application Priority Data

Aug. 1, 1979 [DE] Fed. Rep. of Germany ... 7922047[U]

[51] Int. Cl.³ .............................................. B23B 29/034
[52] U.S. Cl. ..................................... 82/36 R; 408/185
[58] Field of Search ...................... 408/181, 185, 153; 407/101; 82/36 R

[56] References Cited

U.S. PATENT DOCUMENTS

| | | | |
|---|---|---|---|
| 2,043,689 | 6/1936 | Zempel | 408/185 |
| 2,359,957 | 10/1944 | Zempel | 408/181 |
| 3,700,346 | 10/1972 | Eckle | 408/185 |
| 3,709,625 | 1/1973 | Erkfritz | 408/181 |
| 4,018,542 | 4/1977 | Lindsay | 408/181 |
| 4,043,696 | 8/1977 | Wohlhaupter | 408/185 |
| 4,163,624 | 8/1979 | Eckle | 408/185 |

Primary Examiner—Leonidas Vlachos
Attorney, Agent, or Firm—Blanchard, Flynn, Thiel, Boutell & Tanis

[57] ABSTRACT

A tool insert for boring operations, particularly for a boring bar, comprising a housing which can be inserted in a recess in a toolholder, for example the boring bar, and which has a cutting tip support slidably mounted in a longitudinal bore therein, the said cutting tip support having a cylindrical shank, the outer end of the support bearing in a recess a replaceable cutting tip which is staggered laterally relative to the shank axis and the rear end having a thread which is engaged by the thread of an adjusting element rotatably mounted free of play in the housing between axially loaded ball bearings.

8 Claims, 3 Drawing Figures

TOOL INSERT FOR BORING OPERATIONS, PARTICULARLY FOR A BORING BAR

FIELD OF THE INVENTION

This invention relates to a tool insert for boring operations.

BACKGROUND OF THE INVENTION

For certain boring operations it is necessary for the cutting tip to project not only radially over the circumference of the boring bar or over the outline of a toolholder fastened to the boring bar, but also in the axial direction. In addition, the cutting tip should be capable of fine adjustment in the radial direction. For this purpose it is known practice to mount, in a recess in the toolholder, a conventional tool insert in the housing of which is provided a cutting tip support capable of fine adjustment. The axis of this cylindrical recess is inclined at an angle of approximately 53° relative to the axis of the boring bar, hereby fulfilling the requirement that the cutting tip should project forward over the toolholder in the axial direction of the boring bar. The inclined arrangement of the tool insert has the disadvantage that not only the desired radial adjustment of the cutting tip, but also the undesirable axial adjustment thereof take place whenever the cutting tip support is adjusted. Furthermore, the constructional dimensions, in particular the axial length of previously known tool inserts having fine adjustment of the cutting tip support, present certain difficulties for boring bars or tool supports often have central bores, for example for accomodating draw-in spindles to actuate cross slides, etc., or a centrally located screw which serves to fasten the toolholder to the boring bar. For this reason the tool insert cannot on any account extend beyond the centre of the toolholder, but must end even before the said centre in order that the fastening screw may extend past the rear end of the tool insert. A further disadvantage is the small range of adjustment of the tool inserts known for this purpose.

With another known tool insert intended particularly for boring bars, as described in the introduction (cp. German Pat. No. 1 752 012), the cutting tip support has a threaded pin at its rear end. This threaded pin is enclosed by a nut having a collar which is mounted free of play between two ball bearings in the housing of the tool insert, while being preloaded in the axial direction. An extension of the nut projects out of the rear end of the housing and, at this point, has a hexagonal head so that the nut can be turned. To prevent the cylindrical shank of the cutting tip support from being twisted relative to the housing, there is provided a transverse pin which engages in corresponding guide grooves extending in the axial direction of the shank. However, such a means of preventing twisting is only suitable when the effective cutting edge of the cutting tip is staggered only slightly relative to the shank axis. This known tool insert has a relatively great constructional length in the axial direction and is therefore unsuitable for the purpose described in the introduction when machining smaller diameters.

An insert having boring tools at both ends for transversely slotted boring bars is also known (cp. German Pat. No. 1 082 480), the said boring tools being adjustable with an adjusting spindle which is mounted in the longitudinal direction thereof and which has threads spaced at intervals and running in opposite directions. The adjusting spindle can be secured in the transverse hole by a transverse screw engaging in a slot. The adjusting spindle engages each female thread of the shank of the boring tool having a threaded pin, the front end of the said threaded pin having a hexagon socket which is accessible through an axial bore in the boring tool. This known insert cannot be used at all for the purpose mentioned in the introduction as the boring tools are only protected from torsional stress by a clamping screw.

The problem underlying the invention is to provide a tool insert of the type described in the introduction and for the purpose mentioned in the introduction, which has a short constructional length, has a relatively wide range of adjustment and can be fitted in a toolholder or in a boring bar in such a way that axial adjustment is prevented when the cutting tip support is adjusted in the radial direction. In addition, the tool insert should be characterised by stable mounting of the cutting tip.

This problem is solved in accordance with the invention in that the front end of the housing comprises a transverse slot with bounding surfaces which extend substantially parallel to the plane of the cutting tip, that the front end of the shank has a cross piece, the lateral faces of which extend substantially parallel to the plane of the cutting tip and abut on the bounding surfaces of the transverse slot, that the recess for the cutting tip is provided at one end of the cross piece, which end extends at least as far as the wall of the housing, and that the thread in the shank is designed as a female thread, in which the adjusting element engages together with a threaded pin, the front end of the said adjusting element having a hexagon socket which is accessible through an axial bore in the cross piece.

The new tool insert is characterised above all by its very short axial constructional length. It can therefore be inserted in the toolholder or in a boring bar in such a way that the axis of the cutting tip support extends perpendicular to the axis of the boring bar. Therefore, axial adjustment of the boring bar is always prevented whenever the cutting tip support is adjusted in the radial direction. Since the cutting tip is mounted on the cross piece mentioned, it projects in the axial direction over the toolholder or over the boring bar in the desired manner. In order to enable the considerable machining forces to be absorbed by this embodiment, the cross piece is mounted in a transverse slot, open at the front, in the housing and is supported by its lateral surfaces on the bounding surfaces of the transverse slot. A very stable and torsion-free mounting of the cutting tip support and therefore also of the cutting tip is hereby achieved. Moreover, it is advantageous that, with the tool insert according to the invention, the cutting tip support can be adjusted by the front side thereof. Owing to the play-free mounting of the adjusting element, the adjustments of the cutting tip support can be made with great precision.

Other advantageous embodiments of the invention are characterised in the sub-claims.

BRIEF DESCRIPTION OF THE DRAWINGS

The invention is explained in greater detail below with the aid of an exemplary embodiment shown in the drawing, in which:

FIG. 3 shows a partial cross-section along the line III—III in FIG. 1.

DETAILED DESCRIPTION

Figure 1:
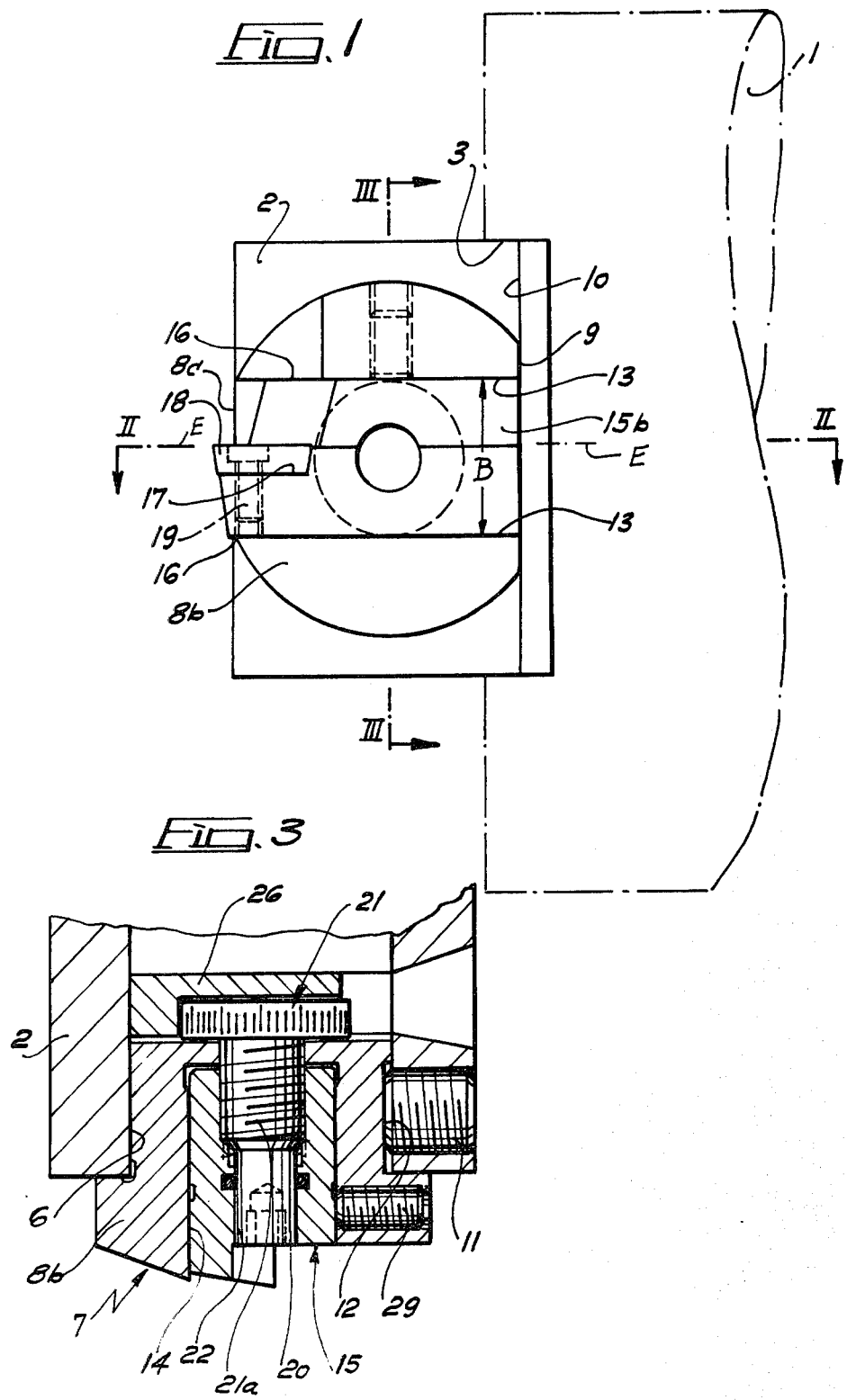
FIG. 1 shows a front view of the tool insert.
Figure 2:
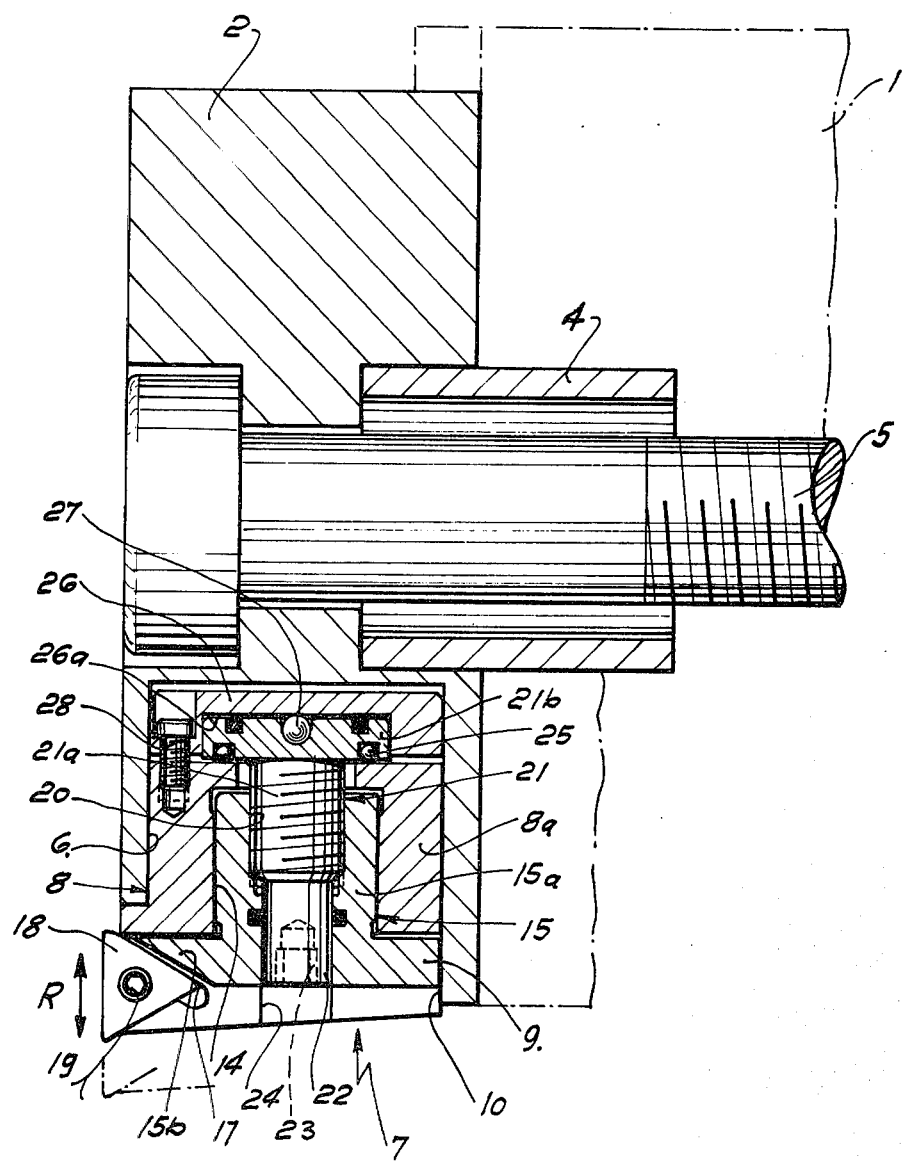
FIG. 2 shows a cross-section along the line II—II in FIG. 1.

In the drawing reference numeral 1 designates the boring bar which is represented by chain-dotted lines and the front free end of which bears a toolholder 2 which is also referred to as a boring head. This toolholder 2 is inserted in a groove 3 provided in the front face of the boring bar 1. It is centred by a bush 4 which engages in both the toolholder 2 and the boring bar 1. The toolholder is retained by means of a fastening screw 5 screwed into the boring bar 1.

The toolholder comprises a cylindrical recess 6 which extends in the radial direction and into which is fitted the housing 8 of the tool insert generally designated by reference numeral 7. This housing 8 advantageously comprises a cylindrical extension 8a, which can be inserted into the recess 6 of the toolholder 2, and a flange 8b which is larger in diameter than the said extension. The flange 8b advantageously has a lateral flat edge 9 by which it is supported on a projecting bearing surface 10 of the toolholder 2. The housing 8 is retained in the toolholder 2 by means of a clamping screw 11 which is supported on a flat edge 12 of the said housing 8.

The front end of the housing 8 comprises, in the flange 8b, a transverse slot which opens towards the front end and which has bounding surfaces 13 extending substantially parallel to the plane of the cutting tip or to the axis of the boring bar 1. The housing 8 also has a longitudinal bore 14 in which the shank 15a of the cutting tip support 15 is slidably mounted. The front end of the shank 15a comprises a cross piece 15b, the lateral faces 16 of which extend substantially parallel to the plane E—E of the cutting tip and abut on the bounding surfaces 13 of the transverse slot.

The cross piece 15b extends advantageously at least as far as the wall 8c of the housing 8. At one end of the cross piece, which projects slightly over the said wall 8c, there is provided a recess 17 for the replaceable triangular cutting tip 18 which is retained in the said recess by means of a screw 19.

The shank 15a also comprises, at its rear end, a female thread 20 in which the threaded pin 21a of an adjusting element 21 engages. The threaded pin 21a has a cylindrical extension 22 with a hexagon socket 23 which is accessible through an axial bore 24 in the cross piece 15b.

The adjusting element advantageously comprises a collar 21b which projects radially over the threaded pin 21a and which is supported by one of its sides on the rear side of the housing 8, with a plurality of balls 25 being interposed. On its other side the collar 21b is enclosed by a cover 26. A central ball 27 is arranged between the inner surface 26a of the cover 26 and the rear side of the collar. The cover 26 is spaced from the rear side of the housing 8 so that a preloading action can be exerted on the balls 25, 27 by means of a plurality of screws 28 and the adjusting element 21 is therefore retained free of play in the axial direction. However, the adjusting element 21 can still be rotated.

The lateral surface of the collar 21b is advantageously provided with a scale graduation and the cover 26 has a lateral recess 28 which extends as far as the lateral surface and through which the graduation can be seen.

In order to achieve optimum support of the cross piece 15b on the bounding surfaces 13 of the transverse slot, the cross piece 15b extends advantageously beyond the shank 15a on both sides. In this case the width of the cross piece B should to some extent correspond to the diameter of the shank, as can be seen from FIG. 1.

A clamping screw 29, which can be screwed on perpendicular to a lateral face 16 of the cross piece 15b, is also provided in the flange 8b.

This clamping screw 29 is loosened to adjust the cutting tip support 15 in the radial direction R. The adjusting element 21 can then be rotated by means of an adjusting tool inserted in the hexagon socket 23 and the cutting tip support is then adjusted in direction R by means of the threaded pin 21a and the female thread 20.

In order that the unavoidable axial play between the threaded pin 21a and the female thread 20 may also be eliminated in this case, the adjustment is effected each time in such a way that the cutting tip support 15 is always displaced in the same direction. After the adjustment is made by the desired degree, the clamping screw 29 is re-tightened. The machining forces exerted on the cutting tip 18 are safely transmitted from the cross piece 15b, via the lateral faces 16 thereof, to the bounding surfaces 13 of the transverse slot and therefore to the housing 8.

We claim:

1. A tool insert for boring operations, comprising a housing which can be inserted in a recess in a toolholder, and which has a cutting tip support slidably mounted in a longitudinal bore therein, the said cutting tip support having a cylindrical shank, the outer end of the support bearing in a recess a replaceable cutting tip which is staggered laterally relative to the shank axis and the rear end thereof having a thread which is engaged by the thread of an adjusting element rotatably mounted free of play in the housing between axially loaded ball bearings, wherein the improvement is comprised in that the front end of the housing comprises a transverse slot with bounding surfaces which extend substantially parallel to the plane (E—E) of the cutting tip, that the front end of the shank has a cross piece, the lateral faces of which extend substantially parallel to the plane (E—E) of the cutting tip and abut on the bounding surfaces of the transverse slot, that the recess for the cutting tip is provided at one end of the cross piece, which end extends at least as far as the wall of the housing, and that the thread in the shank is designed as a female thread in which the adjusting element together with a threaded pin engages the front end of the said adjusting element having a hexagon socket which is accessible through an axial bore in the cross piece.

2. Tool insert as claimed in claim 1, wherein the cross piece extends beyond the shank on both sides.

3. Tool insert as claimed in claim 1 or 2, wherein the width of the cross piece is approximately equal to the diameter of the shank.

4. Tool insert as claimed in claim 1 or 2, wherein the housing comprises a cylindrical extension, which can be inserted in the recess of the toolholder, and a flange which is larger in diameter than the said extension and in which the transverse slot is provided.

5. Tool insert as claimed in claim 4, wherein a clamping screw, which can be screwed perpendicularly to a lateral face of the cross piece, is provided in the flange.

6. Tool insert as claimed in claim 4, wherein the flange comprises a lateral flat edge by which it is supported on a bearing surface of the toolholder.

7. Tool insert as claimed in claim 1, wherein the adjusting element comprises a collar, which projects radially over the threaded pin, is supported by one of its sides on the rear side of the housing between a plurality of balls and is enclosed by a cover, which is screwed to the housing and between the inner surface of which and the rear side of the collar a central ball is arranged.

8. Tool insert as claimed in claim 7, wherein the lateral surface of the collar is provided with a scale graduation and the cover with a lateral recess which extends as far as the lateral surface.

* * * * *